United States Patent
Kronenberg et al.

(10) Patent No.: US 6,717,999 B1
(45) Date of Patent: Apr. 6, 2004

(54) DODECAHEDRON NEUTRON SPECTROMETER WITH TITANIUM PROTON ABSORBER FOR AIRCRAFT

(75) Inventors: Stanley Kronenberg, Skillman, NJ (US); George J. Brucker, West Long Branch, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 31 days.

(21) Appl. No.: 10/224,231

(22) Filed: Aug. 19, 2002

Related U.S. Application Data (62) Division of application No. 09/503,858, filed on Feb. 14, 2000, now Pat. No. 6,349,124.

(51) Int. Cl.$^7$ ................................................. G01T 3/00
(52) U.S. Cl. ...................... 376/153; 376/147; 376/158; 250/300.01; 250/300.09
(58) Field of Search ................................. 376/147, 153, 376/158; 250/390.01, 390.09

(56) References Cited

U.S. PATENT DOCUMENTS 3,780,292 A * 12/1973 Klar .......................... 376/255
5,251,242 A * 10/1993 Impink et al. ............... 376/254

FOREIGN PATENT DOCUMENTS

| JP | 358063878 A | * | 4/1983 |
| JP | 402047581 A | * | 2/1990 |
| JP | 405027042 A | * | 2/1993 |
| JP | 02002311148 A | * | 10/2003 |
| WO | WO 97/13162 | * | 4/1997 |

* cited by examiner

Primary Examiner—Charles T. Jordan
Assistant Examiner—John Richardson
(74) Attorney, Agent, or Firm—Michael Zelenka; George B. Tereschuk (57) ABSTRACT

A neutron spectrometer is provided by a series of substrates covered by a solid-state detector stacked on an absorbing layer. As many as 12 substrates that convert neutrons to protons are covered by a layer of absorbing material, acting as a proton absorber, with the detector placed within the layer to count protons passing through the absorbing layer. By using 12 detectors the range of neutron energies are covered. The preferred dodecahedron embodiment of the neutron spectrometer is a solid, polyethylene dodecahedron assembly with 12 surface facets covered by a solid-state detector stacked on an absorbing layer composed of titanium. Each absorbing layer is constructed with a different thickness according to the minimum and maximum energies of neutrons in the spectrum. In this arrangement, each of the 12 surface pentagon-shaped facets provides a polyethylene substrate to convert neutrons to protons, covered by a layer of absorbing material, acting as a proton absorber, with the detector stacked on the absorbing layer to count protons passing through the absorbing layer. The dodecahedron assembly is housed concentrically within a titanium spherical shell that serves as an outer shield. The dodecahedron embodiment is sufficiently lightweight to be suitable for airborne and satellite applications.

8 Claims, 5 Drawing Sheets

DODECAHEDRON NEUTRON SPECTROMETER WITH TITANIUM PROTON ABSORBER FOR AIRCRAFT

DIVISIONAL APPLICATION

This application is a divisional application of U.S. Patent Office application Ser. No. 09/503,858, entitled "Dodecahedron Neutron Spectrometer," which was filed on Feb. 14, 2000 now U.S. Pat. No. 6,349,124 by the inventors herein. Divisional U.S. Patent Office application Ser. No. 10/006,735, entitled "Neutron Spectrometer," was filed as a divisional application of the first application (Ser. No. 09/503,858) on Nov. 1, 2001 by the inventors herein, is currently pending before the U.S. Patent Office and, under 35 USC §120, is "an application similarly entitled to the benefit of the filing date of the first application." This divisional application is being filed under 35 USC §120, 35 USC §121 and 37 CFR §1.53 (b), and priority from the Feb. 14, 2000 effective date of the first application (Ser. No. 09/503,858) is hereby claimed.

FIELD OF INTEREST

The invention relates to radiation sensors and, more particularly, to a spectrometer to measure an unknown neutron spectrum in outer space.

BACKGROUND OF THE INVENTION

It is often necessary to quickly, accurately and inexpensively measure neutron spectra in low earth orbits covering several energy ranges. High-energy cosmic rays produce neutrons in the upper atmosphere are a particular concern because such neutrons pose a threat to airborne semiconductor equipment such as the memory devices in flight control equipment. Neutrons threaten these devices by causing bit-flips leading to failures in the flight control and navigational equipment, and thereby endangering the operation of both high-flying aircraft like the Concorde and lower altitude commercial aircraft.

There has been a long-standing need to characterize neutron spectra so that physicists and equipment designers can better predict aircraft upset rates and design systems to avoid catastrophic aircraft failures. The general operating principle for neutron spectrometers is that neutrons interact with certain atoms to produce recoil protons that travel in relatively straight lines, as described in Kronenberg, S. and H. Murphy, "Energy Spectrum of Protons Emitted From a Fast-Neutron-Irradiated Hydrogenous Material", Radiation Research 12, 728–735 1960.

Several types of detectors that have been used in prior art neutron spectrometers of this type to measure the recoil protons. One of the earliest applications described in Kronenberg, S., "Fast Neutron Spectroscope for Measurements in a High Intensity Time Dependent Neutron Environment", International Symposium on Nuclear Electronics", Paris France, Comptes Rendus, May 1964. That device utilized a scintillation counter, consisting of cesium iodide and a photomultiplier and solid state devices. A variation of that approach employing a PMOS transistor was described in Kronenberg, S. and G. J. Brucker, "The Use of Hydrogenous Material for Sensitizing PMOS Dosimeters to Neutrons", IEEE Trans. Nucl. Sci., Vol. 42, No. 1, February 1995.

One significant limitation of these prior art devices is that they can only count protons and can neither characterize neutron spectra nor generate the original neutron spectra. These prior art neutron spectrometers suffered from a number of other disadvantages, limitations and shortcomings because of their size, weight cost and complex circuitry, making them unsuitable for use in spacecraft and other airborne applications. In fact, the NASA Goddard Space Flight Center recently requested proposals for the measurement of high-energy spectra with a spectrometer on-board a satellite or the Shuttle spacecraft.

To overcome the prior art's inability to characterize neutron spectra, as well as disadvantages, limitations and shortcomings of size, weight, cost and complex circuitry, the present invention fulfills this long-standing need with a simplified, compact and inexpensive neutron spectrometer detector. The neutron spectrometer detector employs a thin depletion layer, silicon, solid state detector as a proton counter in an instrument that converts a distribution of neutrons to one of recoil protons. The present invention's neutron spectrometer uses computer technology to allow for greater and quicker data reduction and provides the added capability of characterizing neutron spectra by unfolding proton recoil spectra into the original neutron spectrum that produced the proton particles.

The preferred embodiment is a lightweight dodecahedron monitor for aircraft use with an arrangement of detectors, converters and absorbers housed within a sphere, further comprising a titanium proton absorber, polyethylene hydrogenous substrate and titanium spherical chamber. The advantages of low weight, compact size, simplified operation and increased data reduction allow the present invention's neutron spectrometer to fulfill the long-standing need for measuring high-energy spectra onboard a satellite or Shuttle spacecraft, without suffering from the disadvantages, limitations and shortcomings of prior art devices. A flat dodecahedron embodiment of the neutron spectrometer with the detectors, converters and absorbers housed within a box is also described.

SUMMARY OF THE INVENTION

It is one object of the neutron spectrometer to measure neutron spectra on land or in the laboratory.

It is another object of the dodecahedron neutron spectrometer to measure neutron spectra in low earth orbits covering several energy ranges from 1 to 250 MeV.

It is an additional object of the dodecahedron neutron spectrometer to convert a distribution of neutrons to one of recoil protons sorted into numerous energy bins where they are counted and the original neutron spectrum is generated by software.

To attain these and other objects and advantages, the neutron spectrometer of the present invention provides a series of substrates covered by a solid-state detector stacked on an absorbing layer. In this arrangement, as many as 12 substrates that convert neutrons to protons, are covered by a layer of absorbing material, acting as a proton absorber, with the detector placed within the layer to count protons passing through the absorbing layer. By using 12 detectors the present invention covers the range of neutron energies. The present invention encompasses a preferred dodecahedron spectrometer, and other shapes are also possible.

The dodecahedron embodiment of the present invention's neutron spectrometer comprises a solid, polyethylene dodecahedron assembly with its 12 surface facets covered by a solid-state detector stacked on an absorbing layer. In this arrangement, each of 12 surface pentagon-shaped facets provides a polyethylene substrate to convert neutrons to protons, covered by a layer of absorbing material, acting as a proton absorber, with the detector stacked on the absorbing layer to count protons passing through the absorbing layer. The dodecahedron assembly is housed concentrically within a titanium spherical shell that serves as an outer shield. The dodecahedron embodiment is lightweight and therefore would be suitable for airborne and satellite applications.

BRIEF DESCRIPTION OF THE DRAWINGS

Table I is a listing of absorbing layer thicknesses.

DETAILED DESCRIPTION OF THE DRAWINGS

Figure 1:
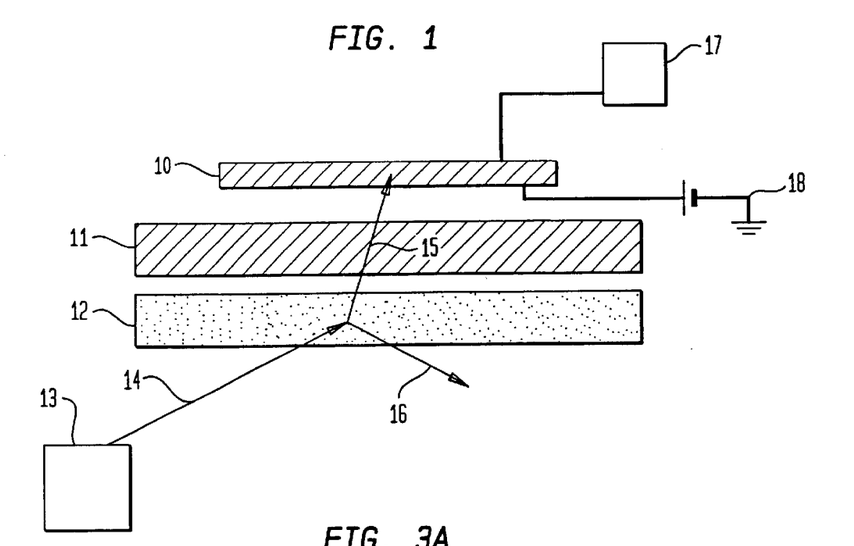
FIG. 1 is a conceptual cross section view of a neutron detector.

Referring now to FIG. 1, the essential principle of operation for the devices of the present invention is illustrated. FIG. 1 is a conceptual cross section view of a single neutron detector comprising a means for detecting neutrons 10 stacked on an absorbing layer 11. The absorbing layer 11, being composed of a first material that absorbs protons, such as titanium, is stacked on a hydrogenous substrate 12. Hydrogenous substrate 12 is composed of a second material having hydrogen atoms interacting with an unknown source of neutrons, indicated by box 13.

When a single neutron detector is placed in a field of a neutron spectrum, the incident neutrons, indicated by arrow 14, from suspected neutron source 13 interact with hydrogen atoms within hydrogenous substrate 12. This interaction produces proton recoils that travel in fairly straight lines, one of which is indicated by arrow 15, through the absorber layer 11 and the detector means 10. Scattered neutrons, indicated by arrow 16, are deflected away from the hydrogenous substrate 12. Detector means 10 is connected to a data processing means, indicated by box 17, and a ground 18. The data processing means 17 includes a means for proton distribution. Using several detector means 10 with each absorbing layer 11 having a different thickness allows protons with energies and corresponding ranges greater than the thickness of a particular absorbing layer 11 to reach detector means 10 and produce proton counts. The amount of absorber layers 11 and their thickness can be selected to correspond to ranges of protons from a low value for 1 MeV and larger thicknesses of 250 MeV. Hydrogenous substrate 12 converts part of the kinetic neutron energy to energy of the recoil protons 15 and the detector means 10 detects protons passing through the absorbing layer 12.

This approach is demonstrated by considering the energy transfer behavior of neutrons and protons. The maximum energy a neutron of energy $E_n$ can transfer to a proton $E_p$ (max) equals $E_n$ (1,2). For this example, assume an absorbing layer 11 thickness of d. For monoenergetic neutrons ($E_n$), the number of recoil protons reaching detecting means 10 and producing proton counts decreases as energy $E_n$ decreases. The number of protons will eventually equal zero when the range of maximum energy recoil protons becomes smaller than d. Recoil particles due to elastic scattering do occur in the higher atomic number non-hydrogenous absorber but, except for very high $E_n$, they do not contribute to the counts due to their small range and the unfavorable quantum energy transfer in elastic scattering.

Having a system with K units, each with a different d and exposing them to a neutron spectrum, one obtains data which consist of K counts or count rate values $C_i(d_i)$ i=1, 2, . . . K where for $d_{i-1}<d_i<d_{i+1}$, $C_{i-1}(d_{i-1})>C_i>C_{i+1}$. From these numbers one can unfold the incident spectrum of neutrons.

The detector means 10 can be of any shape or configuration and can be any type of solid state device. The inventors herein have employed a depleted n/p diode used to measure alpha particles, which was relatively insensitive to beta particles because of their low LET (Linear Energy Transfer) values as a detector means 10. Spectroscopic grade detectors are not required for this device since only event counting is required and data describing the energy spectrum are not needed.

In considering the thicknesses of absorbing layers 11 and the ranges of protons to be measured, an energy range of 1 to 250 MeV was selected to match the expected neutron spectrum distribution. One solution to achieve this objective is to fabricate an instrument that converts a distribution of neutrons to one of recoil protons, which are charged particles that can be easily counted. By employing 12 detector means 10 within a given chamber, the recoil protons are essentially sorted into 12 bins where they can be readily counted. Said absorber layers 11 can be constructed of aluminum for detecting the lower energy levels or tantalum for the higher values. The hydrogenous substrate 12 for each detector means 10 could be constructed of polyethylene.

The data processing means 17 and its means for proton distribution provides a hitherto unavailable capability to determine a proton distribution pattern to construct a neutron spectrum indicating the spectrum of neutrons from an unknown source of neutrons 13. In operation, results of a spectral measurement are a set of pairs from the detector means 10 and the absorbing layer 11 that allows protons with energies and corresponding ranges greater than the absorbing layer 11's thickness to reach the detector means 10 and produce proton recoil counts. One data processing means 17 successfully employed by the present inventors is a 3-dimensional Monte Carlo Adjoint Transport code, NOVICE, which is described in Jordan, T., "Novice, A Radiation Transport and Shielding Code", Experimental and Mathematical Physics Consultant, Report EMP. L 82.001, January 1982.

Figure 2:
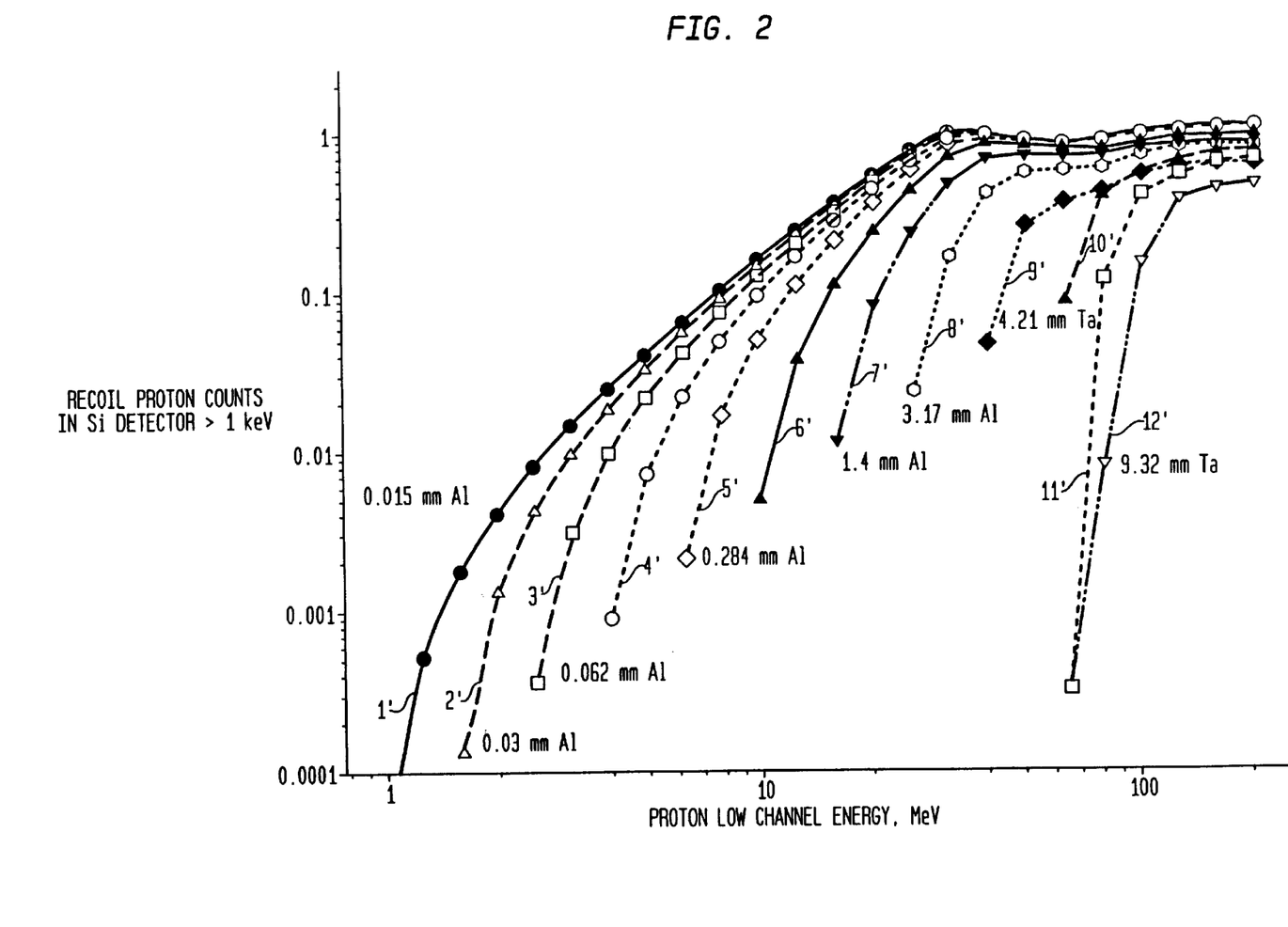
FIG. 2 is a chart that shows plots of counts in the detector versus proton energy with different thicknesses indicated as a parameter on the curves.

FIG. 2 is a chart showing plots of counts in the detector versus proton energy with different thicknesses indicated as a parameter on the curves, and these results were obtained using the NOVICE program and a flat spectrometer 20 depicted in FIG. 6, which will be described below. The FIG. 2 plots are counts in the detector versus proton energy with the aluminum and tantalum thicknesses indicated as a parameter on the curves. In this preliminary assessment of the feasibility of neutron monitor with multiple neutron detectors, an incident neutron spectrum and the subsequent unfolding software were not included in the code's run. The proton recoil spectrum was assumed to exist in the converter material of hydrogenous substrate 12. The separation or resolution of proton energy shown in FIG. 2 provides useful information about detecting 12 ranges of neutron energy. The flat configuration of monitor 20, depicted in FIG. 6, along with the use of tantalum for the absorber layers 11 and for the chamber 21 make it too heavy for spacecraft or other airborne applications. Using a data processing device with the NOVICE computer software to analyze the monitor revealed other more useful potential configurations for neutron spectrometers, which were modeled and analyzed by the computer.

Figure 3A:
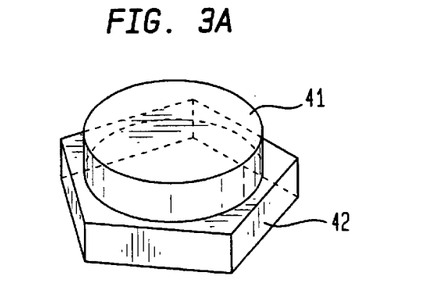
FIGS. 3A and 3B are perspective views of a neutron detector and a dodecahedron neutron spectrometer.
Figure 3B:
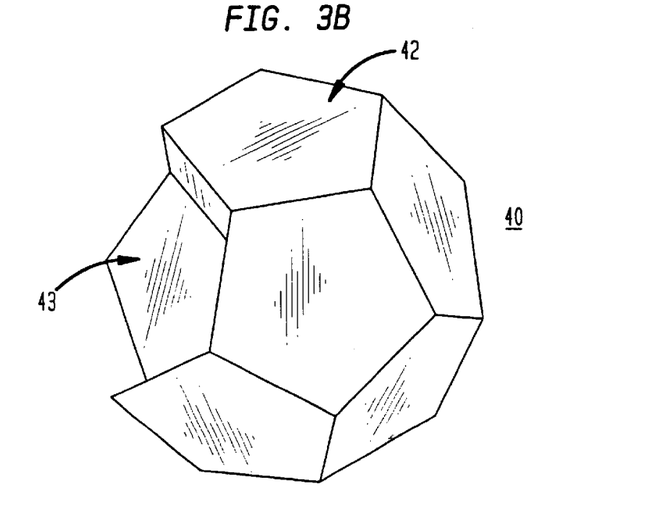

One configuration suggested by the FIG. 2 NOVICE results is a pentagon dodecahedron, which allows for a full measurement range because of its 12 surfaces, each supporting a detector-absorber pair with different absorber layer thicknesses. FIGS. 3A and 3B, are perspective drawings depicting a detector means 41 stacked on a pentagonal absorbing layer 42 and a dodecahedron neutron spectrometer monitor 40, respectively.

Referring now to FIG. 3A, which depicts a perspective view of a neutron detector comprising a detector means 41 stacked on an absorbing layer 42. Absorbing layer 42 is composed of a first material that absorbs protons, such as titanium in this embodiment, or tantalum or aluminum in other embodiments. By placing this assembly on an appropriate hydrogenous substrate, a neutron detector is provided. Referring now to FIG. 3B, dodecahedron neutron spectrometer monitor 40 is depicted with 11 of 12 of the absorbing layers 42 with varying thicknesses stacked on a surface facet of a solid dodecahedron substrate 43, which provides the hydrogenous substrate. Dodecahedron substrate 43 is shown partially exposed without one absorbing layer for illustrative purposes.

Figure 4:
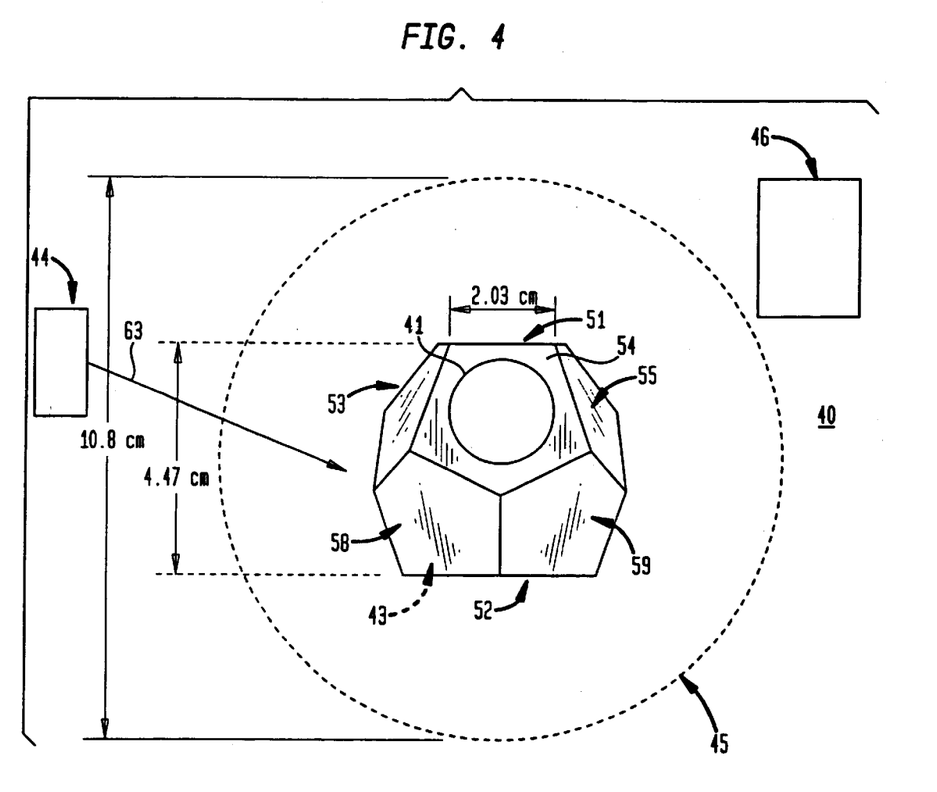
FIG. 4 is a front view drawing of the dodecahedron neutron spectrometer with representative dimensions.

FIG. 4 is a front view drawing of the dodecahedron neutron spectrometer monitor 40 with all absorbing layers 51–62, respectively, covering each of the 12 facets of substrate 43 and representative dimensions. For the sake of clarity, only one detector means 41 is shown stacked on absorbing layer 54, with 11 other detector means 41 for the other 11 absorbing layers 51–53 and 55–62, respectively, not shown. Each of the 12 absorbing layers 51–62 are constructed with a varying thickness and are stacked on a surface facet of the solid dodecahedron substrate 43. Substrate 43 is composed of a hydrogenous material, such as polyethylene, having hydrogen atoms and functions as a neutron converter when interacting with said absorbing layers 51–62 in the presence of an unknown energy distribution, indicated by box 44, which emits incident neutrons, indicated by arrow 63.

Figure 5:
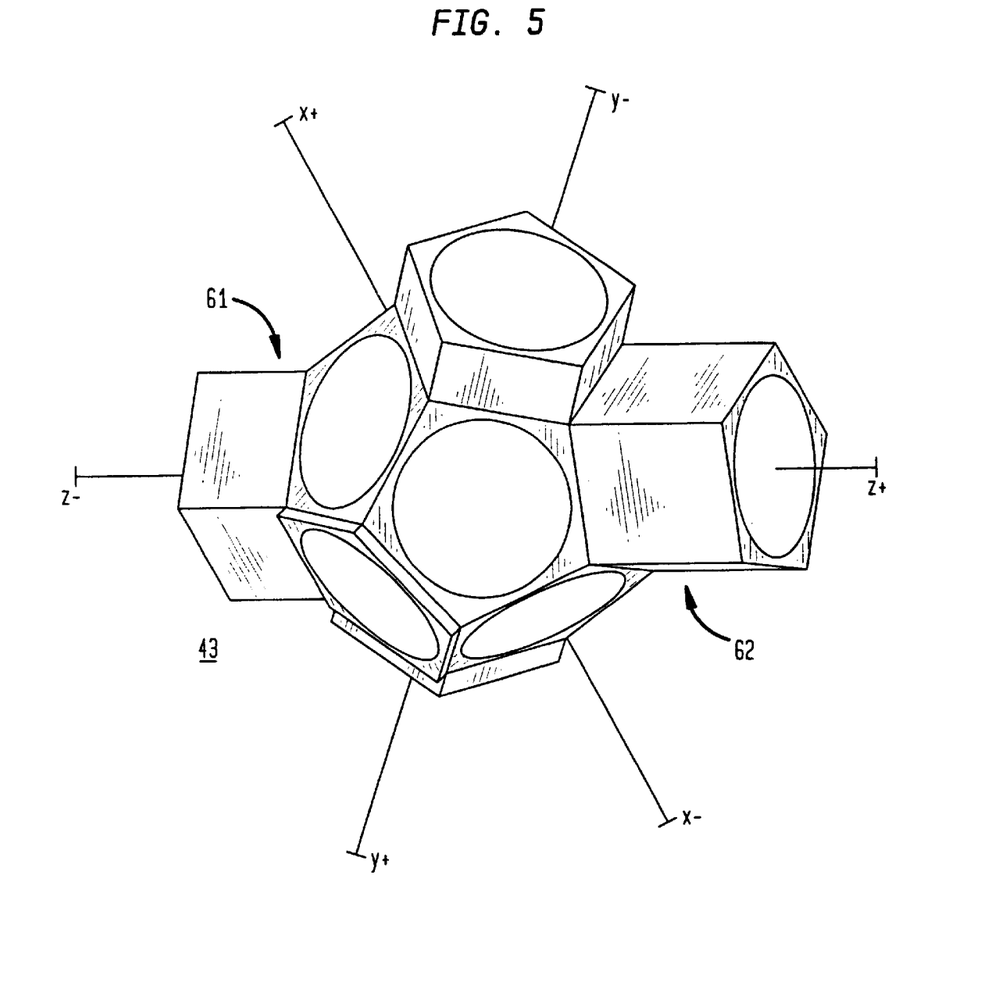
FIG. 5 is a perspective drawing of the dodecahedron neutron spectrometer removed from the shell depicting absorbing layers of varying thickness.

In operation, said hydrogenous substrate 43 converts said neutrons to recoil protons and each of said detector means 41 detects recoil protons passing through each absorbing layer 51–62, respectively. Each absorbing layer 51–62, respectively has a different thickness, as depicted in FIG. 5, to absorb neutron energies from 1 to 250 MeV. Returning now to FIG. 4, the hydrogenous substrate 43 is housed in a concentrically hollow spherical chamber, indicated by broken line 45. Each detector means 41 is coupled to a means for data processing, indicated by box 46, outside the spherical chamber 45, which provides a count of recoil protons to a means for proton distribution, not shown, residing within said data processing means 46. The means for proton distribution determines a proton distribution pattern to construct a neutron spectrum pattern indicating the spectrum of neutrons from said suspected source of neutron radiation 44.

FIG. 4 also includes representative dimensions. Each absorbing layer 51–62 is pentagonally shaped in this embodiment, with each side 2.03 cm in length. Each of said detector means 41 are circular and 0.5" wide and 0.015" thick. Covered hydrogenous substrate 43 is 4.47 cm in height and housed concentrically within hollow spherical chamber 45. Hydrogenous substrate 43 was fabricated from a solid block of Lucite™. The hollow spherical chamber 45 is composed of titanium in this embodiment with an inner diameter of 10.8 cm and a wall thickness of 2.5 cm. Each of said 12 absorbing layers 51–62 is composed of titanium in this embodiment with a varying thickness ranging from 0.00105 cm to 2.4217 cm, as described in Table I below.

TABLE I

ABSORBING LAYER THICKNESS

| ABSORBER | ENERGY (Mev's) | FACET | THICKNESS (cm's) |
| --- | --- | --- | --- |
| 51 | 1.0 | 10 | .00105 |
| 52 | 1.5 | 3 | .00191 |
| 53 | 2.5 | 4 | .00425 |
| 54 | 4.0 | 6 | .00911 |
| 55 | 8.5 | 7 | .02051 |
| 56 | 10.0 | 8 | .04271 |
| 57 | 15.0 | 9 | .08606 |
| 58 | 25.0 | 11 | .21027 |
| 59 | 40.0 | 12 | .48153 |
| 60 | 65.0 | 5 | 1.1353 |
| 61 | 80.0 | 2 | 1.6369 |
| 62 | 100.0 | 1 | 2.4217 |

ABSORBING LAYER THICKNESS

Detector means 41 can be constructed from a depleted n/p diode. It should be understood to those skilled in the art that these dimensions are merely representative and numerous other choices of dimensions are possible.

FIG. 5 is a perspective drawing of hydrogenous substrate 43, using like numerals for similar structural elements, illustrating a number of absorbing layers with a varying thickness. In this drawing, covered hydrogenous substrate 43 is shown removed from the hollow spherical shell 45 to better illustrate each absorbing layer having a different thickness.

Referring back to FIG. 2, which is the chart showing plots of counts in the detector versus proton energy with different thicknesses indicated as a parameter on the curves from the NOVICE program. Those plots from the FIG. 6 flat spectrometer 20, which will be described shortly, are based on using aluminum and tantalum as absorber material. These results suggested using titanium as the preferred absorber material for the FIG. 4 absorbing layers 51–62 for all energy levels, because titanium is lighter than tantalum and its neutrons do not generate nuclear interactions. Only elastic scattering takes place. The proton energy resolution from this embodiment is also relatively good. The FIG. 2 results also indicate that aluminum absorbers produced a slightly better energy resolution for the lower range of energies, 1 to 10 MeV. The size of this dodecahedron configuration is small and light in weight and very practical for a spacecraft application.

In order to insure that an unknown neutron spectrum has an isotropic distribution, the spectrometer 40 can also be located at the center of a titanium sphere with a diameter of 3 inches.

Figure 6:
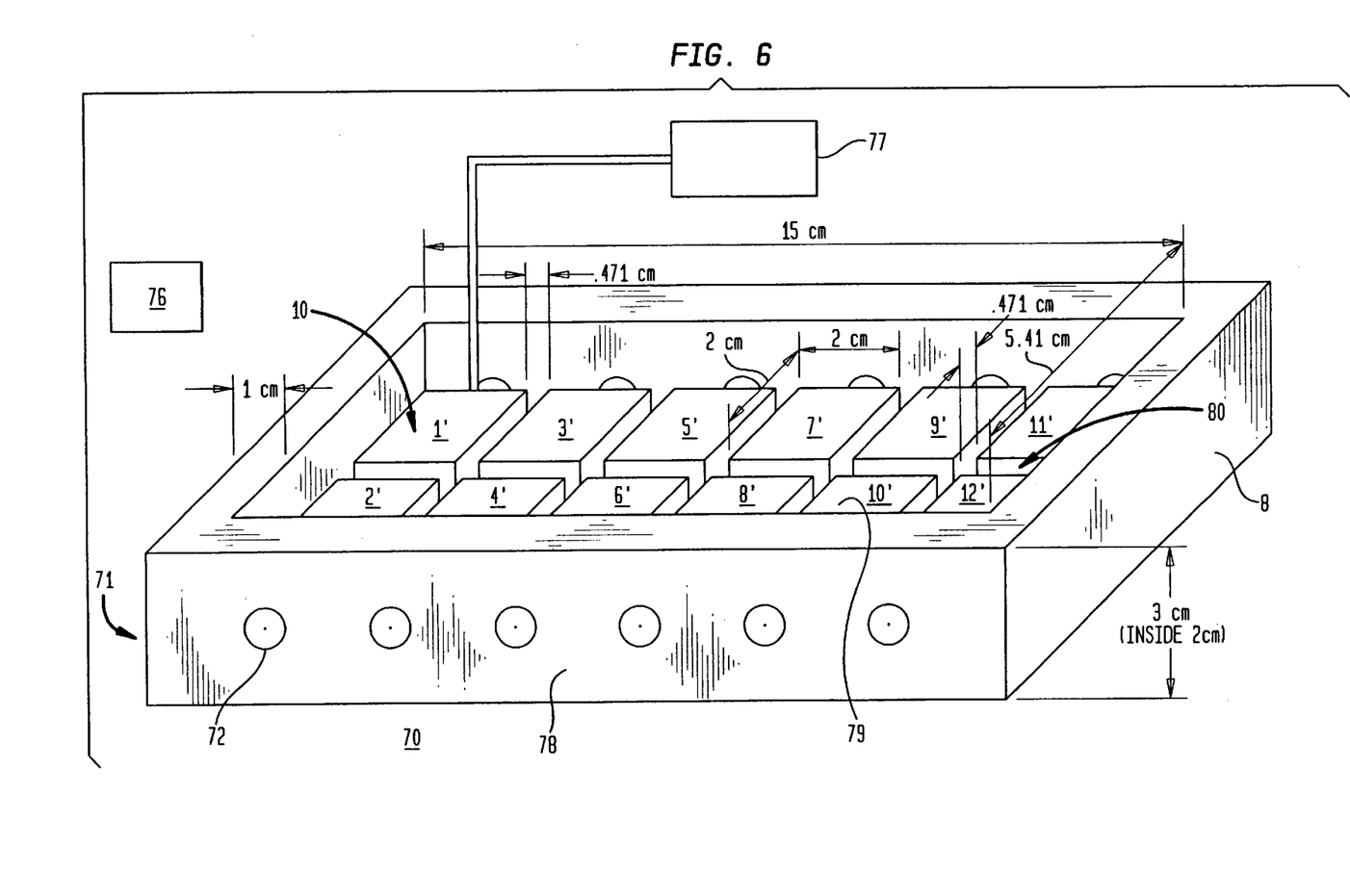
FIG. 6 is a perspective conceptual drawing of the flat neutron spectrometer of the present invention.

FIG. 6 is a perspective conceptual drawing of the flat embodiment of the present invention's neutron spectrometer monitor 70. Monitor 70 comprises a group of the FIG. 1 neutron detector means 10 arranged in a chamber 71. As described above, having several detector means 10 stacked onto absorbing layers, not shown, each having a different thickness, allows protons with energies and corresponding ranges greater than the thickness of each absorbing layer to reach the detector means 10 and produce proton counts. FIG. 6 depicts 12 detector means 10 which correspond to 12 energy bins and thus detect protons with ranges corresponding to energies from 1 MeV up to 250 MeV. The floor of chamber 71 serves as the hydrogenous substrate. Monitor 70 is placed in proximity to an unknown source of neutrons, shown as box 76.

Detecting means 10 is coupled to a means for data processing, indicated by box 77, and provides a separate count of recoil protons for each different thickness employed in the absorbing layers. The data processing means 77 transmits the count of recoil protons to a means for proton distribution, not shown, residing within the data processing means 77. The means for proton distribution determines a proton distribution pattern to construct a neutron spectrum pattern indicating the spectrum of neutrons from the suspected concentration of neutrons 76. Bulkhead output connector 72 on the chamber 71 allows correction of voltage to the detector as well as correction of output counts to counting instruments.

In the flat configuration, said chamber 71 is shown in a rectangular shape, and its walls 78, lid, not shown, and unit compartments 79 can be composed of tantalum. Each detector means 10 in the egg-crate-like structure is numbered 1'–12', respectively, to correspond with readings shown in the FIG. 2 chart. Detector means 7' is depicted with representative dimensions of 2 cm in width and 2 cm in length. A gap 80 between detector means 11' and 12' is 0.471 cm. The thickness of each wall 78 is 1 cm and its height is about 3 cm. The chamber 71 is depicted as 15 cm in length and 5.41 cm in width. These dimensions are merely representative and numerous other choices of dimensions are possible, however, it is critical that each absorber layer is constructed with a different thickness according to the minimum and maximum energies of neutrons in the spectrum. Similarly, the materials used for constructing the absorber layers, detector means 10 and chamber 71 can also be varied according to the minimum and maximum energies of neutrons in the spectrum.

It is to be understood that details concerning materials, shapes and dimensions are merely illustrative, and that other combinations of materials, shapes and dimensions can also be advantageously employed and are considered to be within the contemplation of the present invention. We also wish it to be understood that we do not desire to be limited to the exact details of construction shown and described. It will be apparent that various structural modifications may be made without departing from the spirit of the invention and the scope of the appended claims.

What we claim is:

1. A dodecahedron neutron spectrometer monitor for abstract comprising:

a plurality of neutron detectors;

said monitor is placed in proximity to a suspected concentration of neutron radiation;

each of said plurality of detectors further comprising a detector means stacked on a titanium proton-absorbing layer, each of said proton-absorbing layers being pentagon-shaped and stacked on a separate hydrogenous surface facet of a dodecahedron assembly;

each of said hydrogenous surface facets being composed of polyethylene and containing hydrogen atoms, said hydrogen atoms interacting with said suspected concentration of neutron radiation, converting said neutron radiation to a plurality of recoil protons that travel in straight lines through said proton-absorbing layer and said detector means, each of said detector means detecting said plurality of recoil protons and further comprising a depleted n/p diode;

said surface facets deflecting a plurality of scattered neutrons away from surface facets;

each of said proton-absorbing layers having a different thickness, d, to absorb a plurality of neutron energies from 1 to 250 MeV;

said dodecahedron assembly being housed concentrically in a hollow titaniuim spherical chamber that serves as an outer shield;

each of said detector means, being coupled to a means for data processing, sends a separate count of recoil protons for each of said different thicknesses, d, to said data processing means;

said data processing means providing said separate count of recoil protons to a means for proton distribution; and said means for proton distribution determines a proton distribution pattern to generate a neutron spectrum pattern that constructs an original neutron spectrum from said suspected concentration of neutron radiation.

2. The dodecahedron neutron spectrometer monitor, as recited in claim 1, further comprising:

said plurality of recoil protons reaching said detecting means and producing said separate count of recoil protons that decreases as a neutron energy, $E_n$, decreases;

said separate count of recoil protons decreases to zero when a range of maximum energy recoil protons becomes smaller than said different thickness, d, and;

said plurality of proton-absorbing layers, further comprising K number of proton-absorbing layers, each of said K number of proton-absorbing layers having said different thickness, d, being exposed to said suspected concentration of neutrons, provides a count rate calculated according to the formula:

$$K \text{ count rate values } C_i(d_i) i=1, 2, \ldots K$$

where for $d_{i-1} < d_i < d_{i+1}$, $C_{i-1}(d_{i-1}) > C_i > C_{i+1}$.

3. The dodecahedron neutron spectrometer monitor, as recited in claim 2, further comprising said polyethylene being solid.

4. The dodecahedron neutron spectrometer monitor, as recited in claim 3, further comprising said dodecahedron assembly having at least 12 surface facets.

5. The dodecahedron neutron spectrometer monitor, as recited in claim 4, wherein said surface facets are pentagon-shaped.

6. The dodecahedron neutron spectrometer monitor, as recited in claim 5, wherein each of said plurality of neutron detectors is pentagon-shaped.

7. The dodecahedron neutron spectrometer monitor, as recited in claim 6, further comprising each of said detector means being a solid state detector.

8. The dodecahedron neutron spectrometer monitor, as recited in claim 7, further comprising said dodecahedron assembly having 12 surface facets.

* * * * *

UNITED STATES PATENT AND TRADEMARK OFFICE
CERTIFICATE OF CORRECTION

PATENT NO.     : 6,717,999 B1                                   Page 1 of 1
DATED          : April 6, 2004
INVENTOR(S)    : Stanley Kronenberg and George J. Brucker It is certified that error appears in the above-identified patent and that said Letters Patent is hereby corrected as shown below:

Column 7,
Line 2, change "abstract" to read -- aircraft --.

Signed and Sealed this

Twenty-third Day of November, 2004

JON W. DUDAS
*Director of the United States Patent and Trademark Office*